(12) United States Patent
Lai

(10) Patent No.: US 8,522,448 B2
(45) Date of Patent: Sep. 3, 2013

(54) MEASURING WHEEL

(75) Inventor: Yin-Wu Lai, Taichung (TW)

(73) Assignee: Chih-Yi Chen, Tongluo Township, Miaoli County (TW)

( * ) Notice: Subject to any disclaimer, the term of this patent is extended or adjusted under 35 U.S.C. 154(b) by 133 days.

(21) Appl. No.: 13/304,910

(22) Filed: Nov. 28, 2011

(65) Prior Publication Data
US 2013/0133217 A1 May 30, 2013

(51) Int. Cl.
*G01B 3/12* (2006.01)

(52) U.S. Cl.
USPC .............................................. 33/782; 33/772

(58) Field of Classification Search
USPC .................................... 33/772–782
See application file for complete search history.

(56) References Cited

U.S. PATENT DOCUMENTS

| | | | | |
|---|---|---|---|---|
| 7,040,036 B1 * | 5/2006 | Wang | | 33/782 |
| 7,111,412 B2 * | 9/2006 | Huang | | 33/772 |
| 7,131,216 B2 * | 11/2006 | Nepil | | 33/772 |
| 7,536,805 B1 * | 5/2009 | Tang | | 33/782 |
| 7,555,846 B1 * | 7/2009 | Wang | | 33/772 |
| 7,694,431 B2 * | 4/2010 | Tang | | 33/772 |
| 8,082,676 B2 * | 12/2011 | Tang | | 33/772 |
| 2006/0156573 A1 * | 7/2006 | Huang | | 33/772 |
| 2007/0084076 A1 * | 4/2007 | Wang | | 33/772 |
| 2008/0148591 A1 * | 6/2008 | Kao Lin | | 33/772 |
| 2010/0024235 A1 * | 2/2010 | Tang | | 33/782 |
| 2010/0024236 A1 * | 2/2010 | Tang | | 33/782 |

\* cited by examiner

*Primary Examiner* — Yaritza Guadalupe-McCall
(74) *Attorney, Agent, or Firm* — patenttm.us

(57) ABSTRACT

A measuring wheel includes a handle set, a first rod, a second rod, a wheel seat and a wheel. The first rod is mounted on the handle set and has a first seat mounted on the first rod. The first seat includes a first body, a first pivotal portion and a buckling unit. The first body has an assembling groove and a supporting recess. The second rod is pivotally connected with the first rod and has a second seat assembled with the first seat. The second seat includes a second body and a second pivotal portion. The second body has a supporting block and a buckling groove defined in the supporting block. The buckling unit has an end aligning with an outer periphery of the supporting recess in the bottom surface of the first body to prevent from hitting.

13 Claims, 7 Drawing Sheets

MEASURING WHEEL

BACKGROUND OF THE INVENTION

1. Field of the Invention

The present invention relates to a measuring device, and more particularly to a measuring wheel.

2. Description of Related Art

With reference to FIG. 7, a conventional measuring wheel includes a handle, a panel connected to the handle, a first rod 90, a second rod 91, a locker 92 and a locking portion 93. The first rod 90 has two ends. One of the ends of the first rod 90 is connected to the handle and the other one of the ends of the first rod 90 is pivotally connected to the second rod 91. The second rod 91 is rotatably connected to a wheel. The locker 92 is pivotally mounted on the first rod 90 and is located between the first rod 90 and the second rod 91. The locker 92 protrudes from a distal end of the first rod 90. The locking portion 93 is disposed on a distal end of the second rod 91 and aligns the distal end of the second rod 91. The locker 92 is pivotally buckled on the locking portion 93 such that the first rod 90 and the second rod 91 are co-axially fixed relative to each other.

However, the locker 92 protrudes from the distal end of the first rod 90 for buckling on the locking portion 93. When the conventional measuring wheel is folded and the first rod 90 is pivoted relative to the second rod 91, the locker 92 sticks out from the whole conventional measuring wheel and is easily hit and broken, such that the first rod 90 is not able to be fastened to the second rod 91.

To overcome the shortcomings, the present invention tends to provide a measuring wheel to mitigate or obviate the aforementioned problems.

SUMMARY OF THE INVENTION

The main objective of the invention is to provide a measuring wheel that includes a handle set, a first rod, a second rod, a wheel seat and a wheel. The handle set includes a handle and a panel mounted on the handle.

The first rod is mounted on the handle set and has a first seat mounted on one end of the first rod. The first seat includes a first body, a first pivotal portion and a buckling unit. The first body is disposed on the end of the first seat and has an assembling groove defined in a side of the first body and a supporting recess defined in a bottom surface of the first body and communicating with the assembling groove. The first pivotal portion extends from the first body. The buckling unit is pivotally mounted in the assembling groove in the first body and is located adjacent to the bottom surface of the first body. The second rod is pivotally connected with the first rod and has a second seat mounted on one end of the second rod and pivotally assembled with the first seat of the first rod. The second seat includes a second body and a second pivotal portion. The second body is disposed on the end of the second rod and has a supporting block protruding from the second body for correspondingly inserting into the supporting recess. The supporting block has a buckling groove defined in one side of the supporting block for selectively receiving the buckling unit. The second pivotal portion extends from a top of the second seat and is pivotally connected to the first pivotal portion. The wheel seat is mounted on the second rod and is located opposite to the second seat. The wheel is rotatably mounted on the wheel seat.

The buckling unit has one end aligning with an outer periphery of the supporting recess in the bottom surface of the first body.

Other objects, advantages and novel features of the invention will become more apparent from the following detailed description when taken in conjunction with the accompanying drawings.

DETAILED DESCRIPTION OF PREFERRED EMBODIMENT

Figure 1:
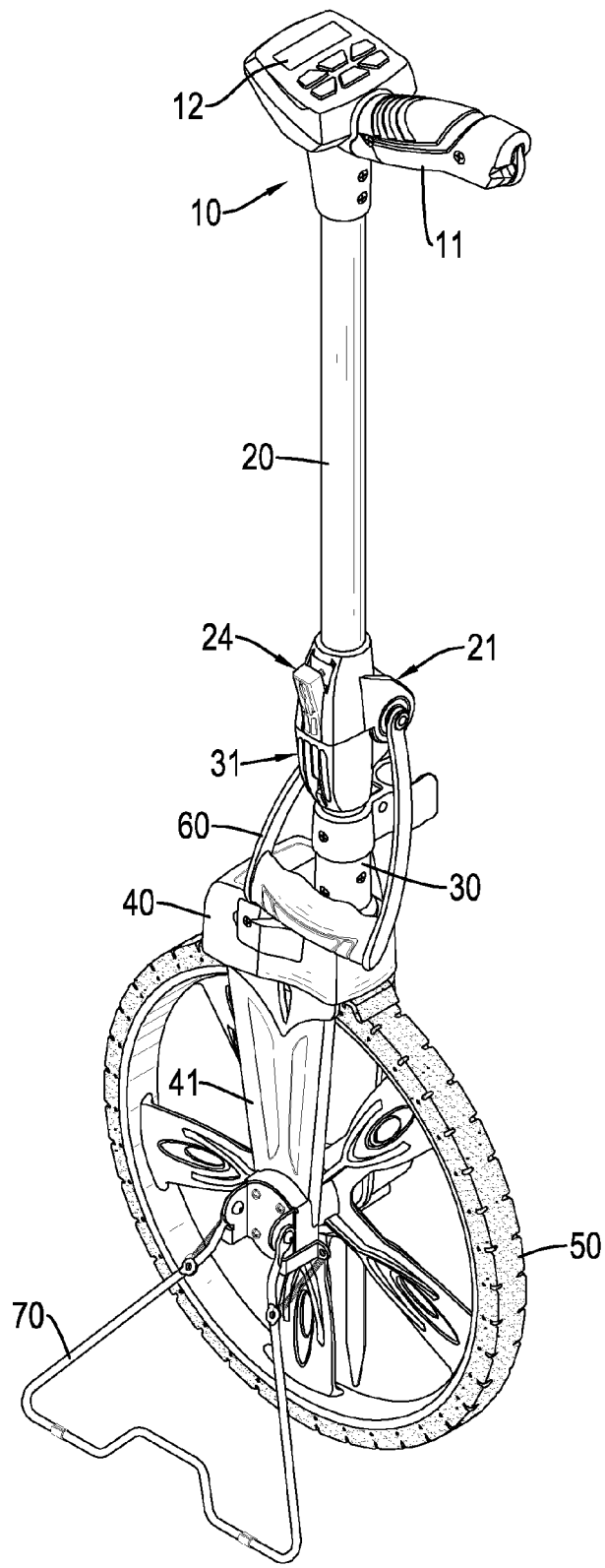
FIG. 1 is a perspective view of a measuring wheel in accordance with the present invention.
Figure 2:
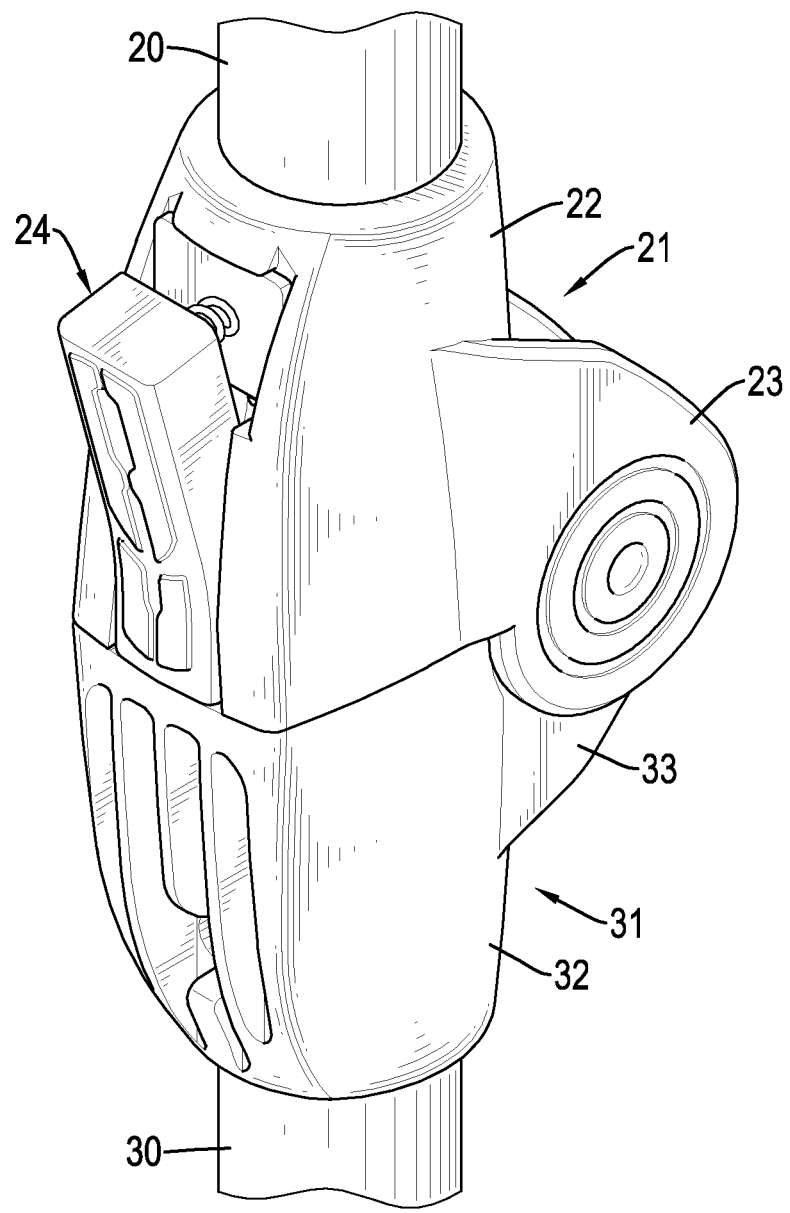
FIG. 2 is an enlarged perspective view of a first seat and a second seat of the measuring wheel in FIG. 1.
Figure 3:
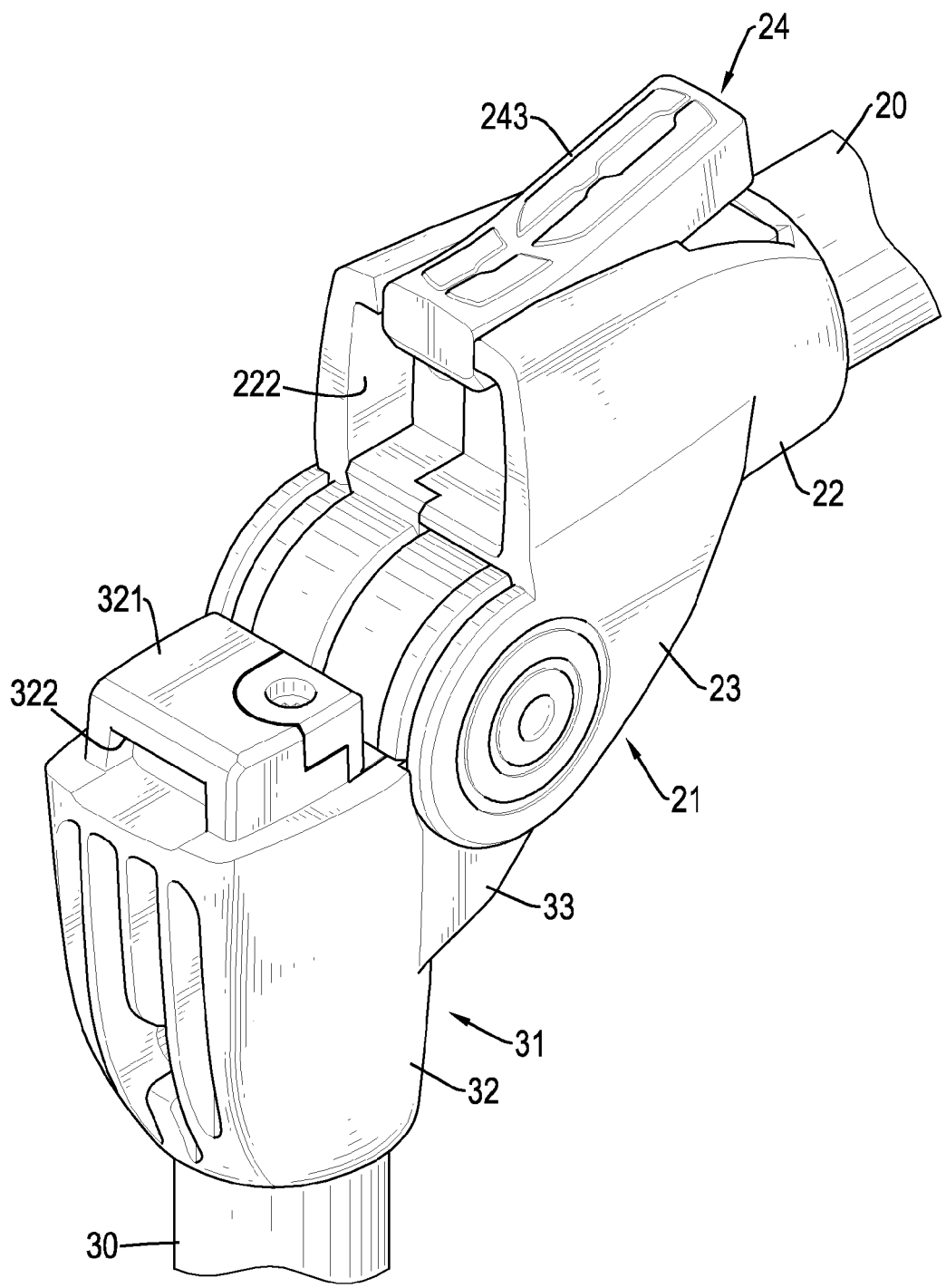
FIG. 3 is an operational perspective view of the first seat and the second seat in FIG. 2, shown the first seat is pivoted relative to the second seat.

With reference to FIGS. 1 to 3, a measuring wheel in accordance with the present invention comprises a handle set 10, a first rod 20, a second rod 30, a wheel seat 40, a wheel 50, an ear 60 and a stand 70.

The handle set 10 comprises a handle 11 and a panel 12 mounted on the handle 11. Preferably, the panel 12 can be an electrical control panel or a mechanical displaying panel.

Figure 4:
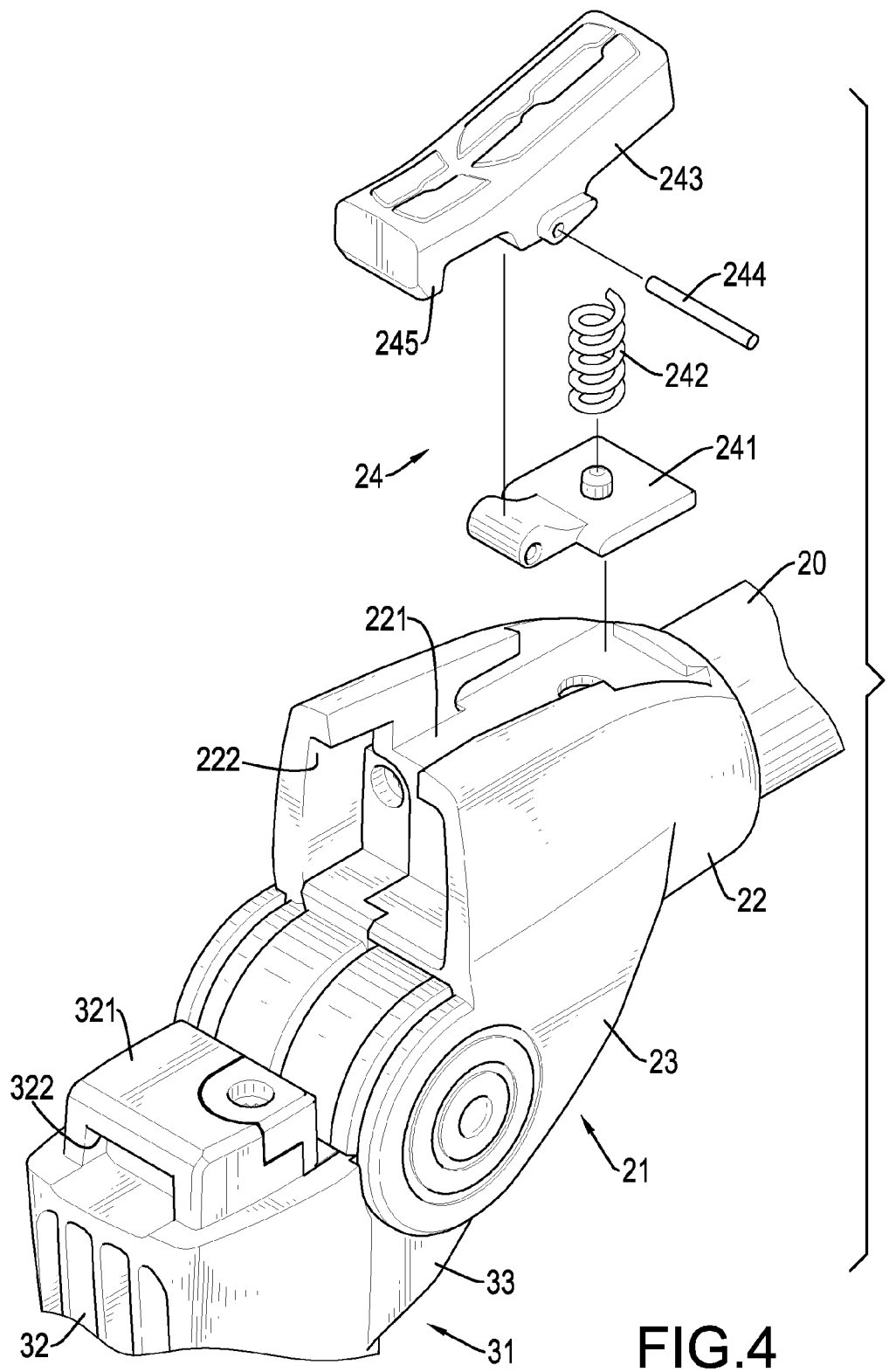
FIG. 4 is an exploded perspective view in partial section in FIG. 3.

With reference to FIGS. 2 to 4, the first rod 20 has two ends and a first seat 21. One of the ends of the first rod 20 is mounted on the handle set 10. The first seat 21 is mounted on the other one of the ends of the first rod 20. The first seat 21 has a first body 22, a first pivotal portion 23 and a buckling unit 21. The first body 22 is disposed on the first seat 21 and has an assembling groove 221 and a rectangular supporting recess 222. The assembling groove 221 is longitudinally defined in a side surface of the first body 22. The supporting recess 222 is defined in a bottom surface of the first body and communicates with the assembling recess 221. A periphery of the supporting recess 222 in the first body 22 is flush to form a plane. The first pivotal portion 23 protrudes from a side of the first body 22, is located opposite to the assembling groove 221 and extends downwardly to protrude from the bottom of the first body 22. The buckling unit 24 is pivotally mounted on the first body 22 and is received in the assembling groove 221. The buckling unit 24 comprises a pivotal board 21, a resilient member 242, a pivotal clasp 243 and a pintle 244. The pivotal board 241 is pivotally mounted on the first body 22 and is received in the assembling groove 221. The resilient member 242 has two ends. One of the ends of the resilient member 242 is mounted on the pivotal board 241 and the other one of the ends of the resilient member 242 abuts on the pivotal clasp 243. Preferably, the resilient member 242 is a spring. The pivotal clasp 243 is in an elongated rectangular shape and is pivotally mounted on the pivotal board 241. The pivotal clasp 243 has one end aligning with the plane of the bottom surface of the first body 22 and a protrusion 245 inwardly extending from the end of the pivotal clasp 243. The pintle 244 is mounted through the pivotal board 241 and the pivotal clasp 243 for pivotally assembling the pivotal board 241 and the pivotal clasp 243 with the first body 22.

The second rod 30 has two ends. One of the ends of the second rod 30 is pivotally connected with the first rod 20 and the other one of the ends of the second rod 30 is mounted on the wheel seat 40. The second rod 30 has a second seat 31 pivotally connected to the first seat 21 of the first rod 20. The second seat 31 has a second body 32 and a second pivotal portion 33. The second body 32 is disposed on the second rod 30. The second body 32 has a rectangular supporting block 321 protruding from a top of the second body 32 for correspondingly inserting into the supporting recess 222. The supporting block 321 has a buckling groove 322 defined in one side of the supporting block 322 for correspondingly receiving the protrusion 245 of the buckling unit 24. The second pivotal portion 33 protrudes from a side of the second body 32, is located opposite to the buckling groove 322 and extends upwardly to protrude from the top of the second body 32. The second pivotal portion 33 is pivotally and correspondingly connected with the first pivotal portion 23, such that the first seat 21 is pivotable relative to the second seat 31 as a pivot of the first pivotal portion 23 and the second pivotal portion 33.

The wheel seat 40 is mounted on the second rod 30 and has two connecting plates 41 extending from the wheel seat 40. A measuring mechanism is mounted in the wheel seat 40 for detecting a rotational displacement of the wheel 50.

The wheel 50 is rotatably mounted between the two connecting plates 41 of the wheel seat 40.

An ear 60 has two ends respectively and pivotally connected to two sides of the first seat 21. The ear 60 is formed of rubber and is bendable.

A stand 70 is pivotally mounted on one of the two connecting plates 41 of the wheel seat 40 for providing a support.

Figure 5:
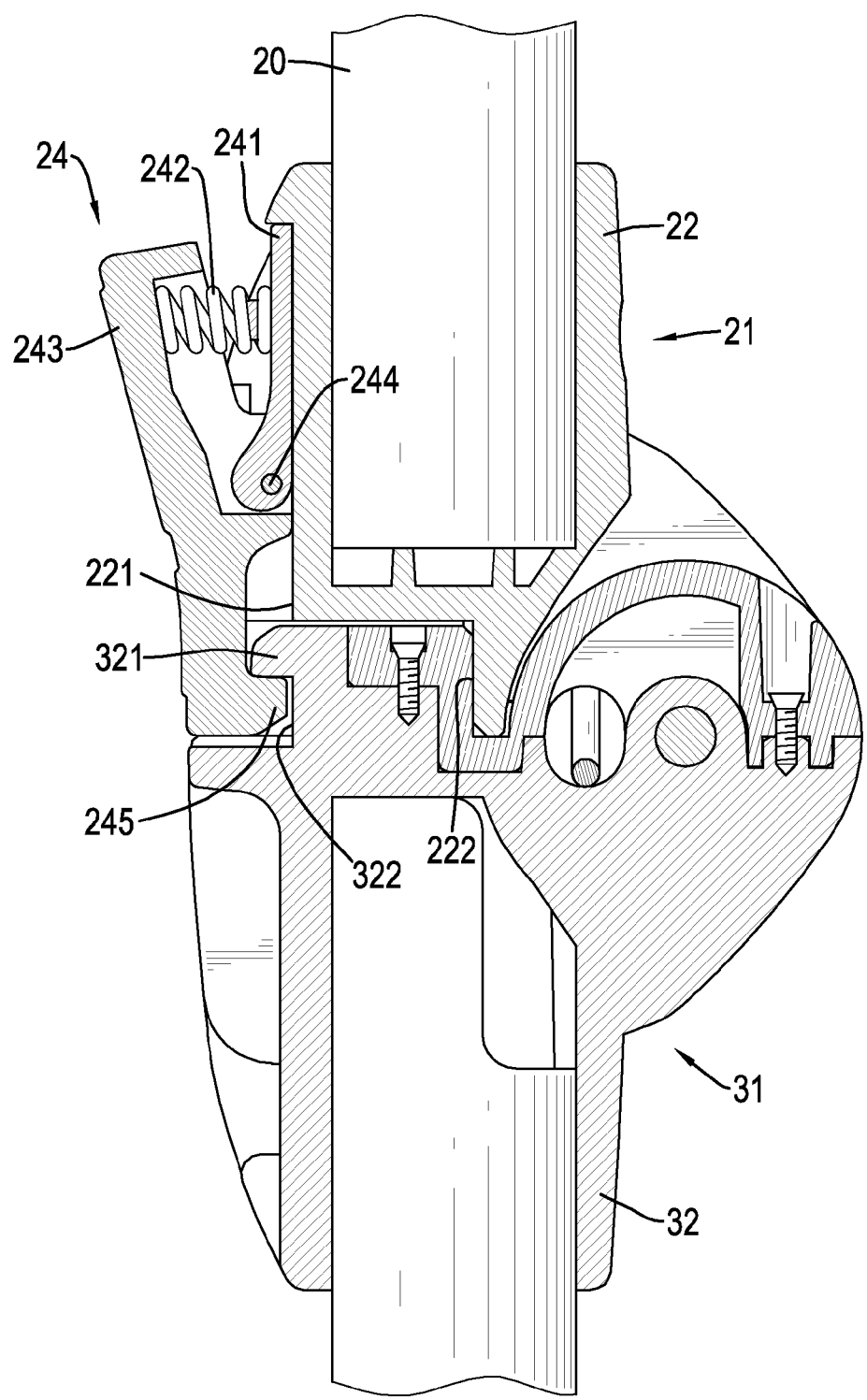
FIG. 5 is a side view in partial section of the handle seat and the joint seat in FIG. 2.

With reference to FIG. 5, the protrusion 245 of the pivotal clasp 243 is received in the buckling groove 322 and abuts to the inner surface of the buckling groove 322. The first seat 21 of the first rod 20 is fixed on the second seat 31 of the second rod 30, such that the first rod 20 axially aligns with the second rod 30. The supporting block 321 is correspondingly received in the supporting recess 222 for strengthening an inner surface of the supporting recess 222 in the first body 22 and enhancing a connection between the first seat 21 and the second seat 31.

Figure 6:
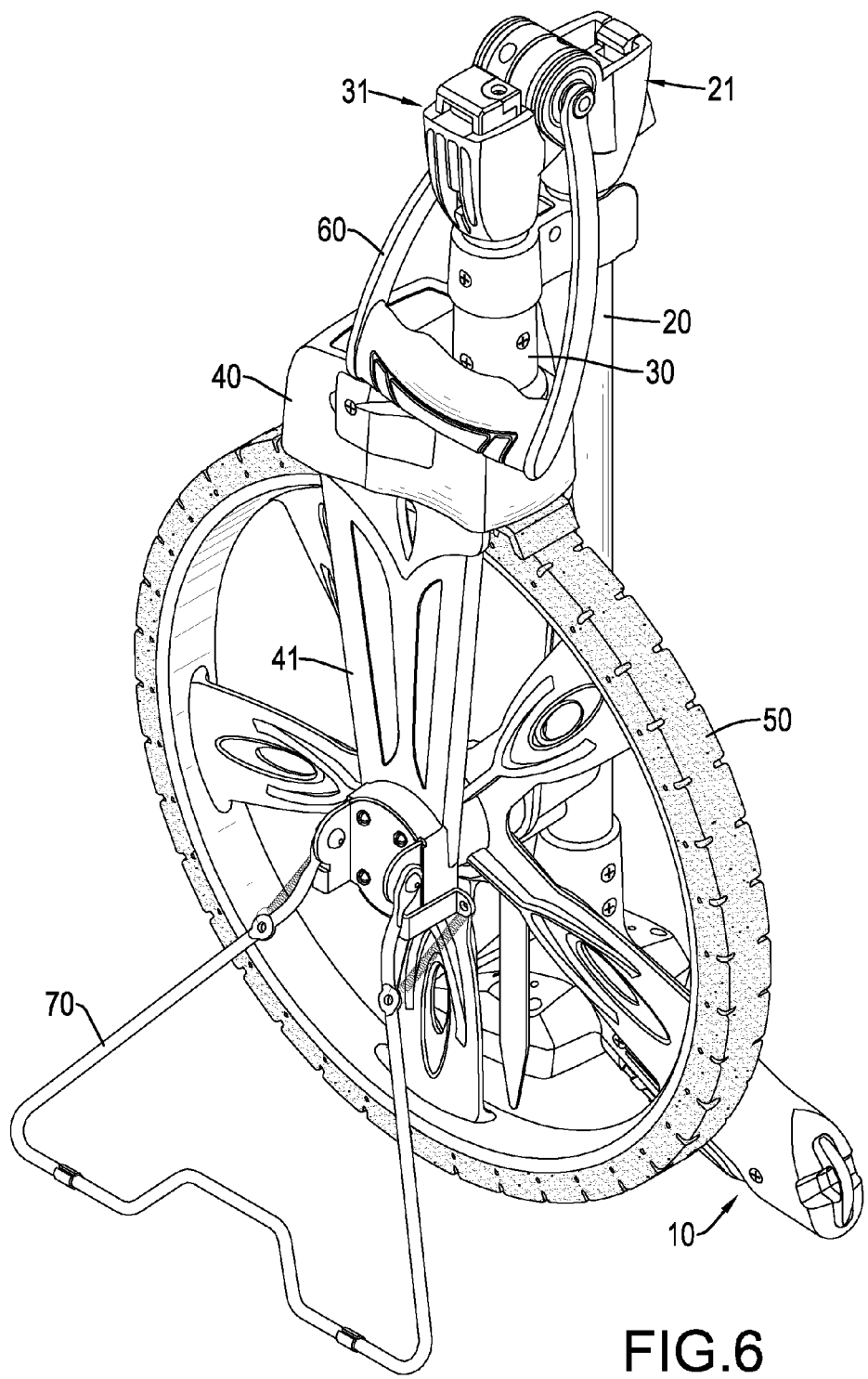
FIG. 6 is an operational perspective view of the measuring wheel in folding position in FIG. 1.
Figure 7:
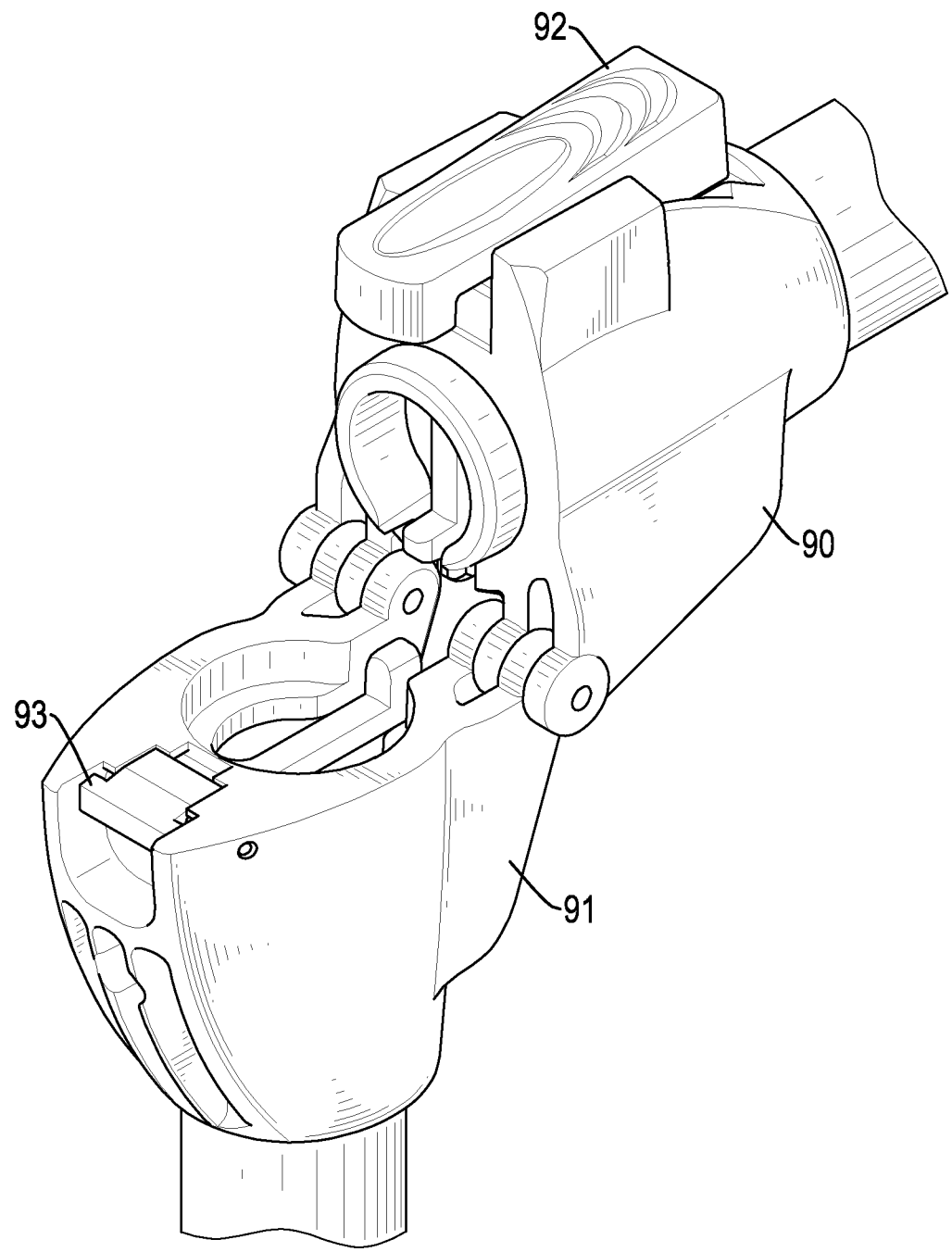
FIG. 7 is a perspective view of a first rod and a second rod of a conventional measuring wheel in accordance with the prior art.

With reference to FIG. 6, one end of the pivotal clasp 243, which is opposite to the end of the protrusion 245, is pressed and is pivoted. The protrusion 245 is detached from the buckling groove 322, such that the first rod 20 and the handle set 10 are folded relative to the second rod 30, the wheel seat 40 and the wheel 50. The first rod 20 is pivoted relative to the second rod 30 and is parallel to the second rod 30. The ear 60 is upwardly pivoted for carrying purpose. The supporting recess 222 orients upwardly. The pivotal clasp 243 aligns with the plane formed on the periphery of the supporting recess 222 in the bottom surface of the first body 22 and does not protrude from the plane, such that the pivotal clasp 243 is protected by the first body 22 located at an inner side of the supporting recess 222 to prevent from hitting.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A measuring wheel comprising:
   a handle set including a handle and a panel mounted on the handle;
   a first rod mounted on the handle set and having a first seat mounted on the first rod, the first seat including
      a first body disposed on the end of the first seat and having an assembling groove defined in a side of the first body and a supporting recess defined in a bottom surface of the first body and communicating with the assembling groove;
      a first pivotal portion extending from the first body; and
      a buckling unit pivotally mounted in the assembling groove in the first body and located adjacent to the bottom surface of the first body; and
   a second rod pivotally connected with the first rod and having a second seat mounted on the second rod and pivotally assembled with the first seat of the first rod, the second seat including
      a second body disposed on the end of the second rod and having a supporting block protruding from the second body for correspondingly inserting into the supporting recess, the supporting block having a buckling groove defined in one side of the supporting block for selectively receiving the buckling unit; and
      a second pivotal portion extending from a top of the second seat and pivotally connected to the first pivotal portion; and
   a wheel seat mounted on the second rod and located opposite to the second seat; and
   a wheel rotatably mounted on the wheel seat.

2. The measuring wheel as claimed in claim 1, wherein the buckling unit has one end aligning with an outer periphery of the supporting recess in the bottom surface of the first body.

3. The measuring wheel as claimed in claim 2, wherein the buckling unit includes
   a pivotal board pivotally mounted on the first body and received in the assembling groove;
   a resilient member mounted on the pivotal board;
   a pivotal clasp pivotally mounted on the pivotal board, abutting against the resilient member, having one end aligning with the bottom surface of the first body, and having a protrusion inwardly extending from the end of the pivotal clasp for corresponding to the buckling groove in the second body; and
   a pintle mounted through the pivotal board and the pivotal clasp for pivotally assembling the pivotal board and the pivotal clasp with the first body.

4. The measuring wheel as claimed in claim 3, wherein the wheel seat has a stand pivotally mounted on one side of the wheel seat.

5. The measuring wheel as claimed in claim 4 further comprising an ear having two ends respectively and pivotally connected to two sides of the wheel seat.

6. The measuring wheel as claimed in claim 3 further comprising an ear having two ends respectively and pivotally connected to two sides of the wheel seat.

7. The measuring wheel as claimed in claim 2, wherein the wheel seat has a stand pivotally mounted on one side of the wheel seat.

8. The measuring wheel as claimed in claim 2 further comprising an ear having two ends respectively and pivotally connected to two sides of the wheel seat.

9. The measuring wheel as claimed in claim 1, wherein the buckling unit includes
   a pivotal board pivotally mounted on the first body and received in the assembling groove;

a resilient member mounted on the pivotal board;

a pivotal clasp pivotally mounted on the pivotal board, abutting against the resilient member, having one end aligning with the bottom surface of the first body, and having a protrusion inwardly extending from the end of the pivotal clasp for corresponding to the buckling groove in the second body; and a pintle mounted through the pivotal board and the pivotal clasp for pivotally assembling the pivotal board and the pivotal clasp with the first body.

10. The measuring wheel as claimed in claim 9, wherein the wheel seat has a stand pivotally mounted on one side of the wheel seat.

11. The measuring wheel as claimed in claim 9 further comprising an ear having two ends respectively and pivotally connected to two sides of the wheel seat.

12. The measuring wheel as claimed in claim 1, wherein the wheel seat has a stand pivotally mounted on one side of the wheel seat.

13. The measuring wheel as claimed in claim 1 further comprising an ear having two ends respectively and pivotally connected to two sides of the wheel seat.

* * * * *